(12) United States Patent
Tanaka et al.

(10) Patent No.: US 8,597,787 B2
(45) Date of Patent: Dec. 3, 2013

(54) CATIONIC DYEABLE POLYURETHANE ELASTIC YARN AND METHOD OF PRODUCTION

(75) Inventors: Toshihiro Tanaka, Shiga (JP); Hirokuni Inoue, Osaka (JP); Masahi Hara, Shiga (JP); Tatsuaki Kanbayashi, Shiga (JP)

(73) Assignee: INVISTA North America S.à.r.l., Wilmington, DE (US)

( * ) Notice: Subject to any disclaimer, the term of this patent is extended or adjusted under 35 U.S.C. 154(b) by 880 days.

(21) Appl. No.: 12/517,594

(22) PCT Filed: Dec. 13, 2007

(86) PCT No.: PCT/JP2007/073998
§ 371 (c)(1),
(2), (4) Date: Dec. 9, 2009

(87) PCT Pub. No.: WO2008/075605
PCT Pub. Date: Jun. 26, 2008

(65) Prior Publication Data
US 2010/0130083 A1    May 27, 2010

(30) Foreign Application Priority Data

Dec. 15, 2006  (JP) ................. 2006-337892
Jun. 18, 2007  (JP) ................. 2007-159781

(51) Int. Cl.
*B32B 27/02*    (2006.01)

(52) U.S. Cl.
USPC ........ 428/357; 442/306; 442/329; 264/176.1; 428/394

(58) Field of Classification Search
USPC ................ 428/357; 442/306, 329; 264/176.1
See application file for complete search history.

(56) References Cited

U.S. PATENT DOCUMENTS

| 3,653,798 A * | 4/1972 | Boardman ................. 8/480 |
| 6,635,347 B1 | 10/2003 | Yoshida |
| 6,846,336 B1 * | 1/2005 | Gerle et al. ................ 8/561 |
| 2004/0019146 A1 * | 1/2004 | Nishikawa et al. ........... 524/507 |

FOREIGN PATENT DOCUMENTS

| EP | 0843032 | 5/1998 |
| JP | 60-44406 | 10/1985 |
| JP | 07-68657 | 7/1995 |
| JP | 2000-073233 | 3/2000 |
| JP | 2000-96434 | 4/2000 |
| JP | 2001-140167 | 5/2001 |
| JP | 2002-249930 | 6/2002 |

OTHER PUBLICATIONS

XP002560433, WO, Oct. 30, 2003, Toyo Boseki KK.
XP002560447, WO, Aug. 3, 1993, Toyobo KK.

* cited by examiner

*Primary Examiner* — Elizabeth Cole

(57) ABSTRACT

Disclosed is a polyurethane elastic yarn which is excellent in elongation, resilience, heat resistance, alkali resistance, chemical resistance, and capability of being dyed with a cationic dye and which is suitable for use in a stretch cloth, a wearing apparel or the like. The polyurethane elastic yarn comprises: an elastic yarn comprising a polyurethane mainly composed of a polymer diol and a diisocyanate; and a polymer of a compound having a sulfonate group contained in the elastic yarn.

13 Claims, No Drawings

CATIONIC DYEABLE POLYURETHANE ELASTIC YARN AND METHOD OF PRODUCTION

FIELD OF THE INVENTION

The present invention relates to a polyurethane elastic yarn, which has high strength stretch, high resilience, alkali resistance, resistance to various chemical agents, high heat resistance and the capability of being dyed with colorfast cationic dyes, and method of production thereof.

BACKGROUND OF RELATED TECHNOLOGY

Elastic fiber finds broad application as an industrial material and stretchable fabric material, which, due to its excellent stretch characteristics, is used in leg wear, inner wear, sportswear, etc.

High strength stretch, high resilience, high chemical resistance, high heat resistance and dye colorfastness are required of such elastic fibers, especially polyurethane elastic yarns. In particular, in the area of chemical resistance, fabric blends using combinations with polyester yarn have seen strong demand, and processing such polyesters to make them lighter in weight and stain resistant requires resistance to chemicals such as alkalis, quaternary ammonium salts, unsaturated fatty acids, etc.

Conventional technology that has been used to impart such chemical resistance involves including polyvinylidine fluoride in the polyurethane spinning solution. See Japanese Patent No. Sho 60-44406.

However, such polyurethane elastic yarn which includes polyvinylidine fluoride exhibits inadequate resilience and heat resistance, and especially, when used in blended fabrics with polyester yarn that undergo weight reduction or stain proofing processing, the chemical resistance of the resulting fabric is insufficient, which can limit its use.

Other such technology involves including modified polyvinyl alcohol sulfonate or synthetic tannins of sulfone compounds in the polyurethane spinning solution. See U.S. Pat. No. 6,635,347 and Japanese Patent No. Hei 7-68657. However, even when compounds containing sulfonate groups are included, their low content ratio also causes unsatisfactory levels of chemical resistance, especially in polyester blended fabrics that require stain proofing processing. Further, in the case of the latter, the compounds themselves exhibit a dark brown color, which strongly adheres to the resulting yarn, thereby limiting its use.

Furthermore, polyurethane elastic yarn is made from a wide variety of raw materials, and it is used in an increasingly broad range of blends, not just with synthetic fibers such as nylon or polyester, but also with natural fibers such as cotton, wool, and semi-synthetic fibers. Accordingly, when stretchable products are dyed, good colorfastness may also be required depending upon the application.

In conventional stretchable products, each of the raw materials is dyed independently which leads to good colorfastness, but since such good colorfastness cannot be achieved in polyurethane fibers, they are usually left undyed. The reasons for this lie in the chemical structure, in that the polyurethane polymer does not have sufficient functional groups for dye adsorption, and further, due to its low degree of crystallization, once dyed, it cannot retain the dye in a colorfast manner. Accordingly, in fabrics containing polyurethane elastic yarn, the only way to achieve a practical degree of colorfastness is through the repeated washing of the fabric to remove the dye that has not been chemically adsorbed. However, not only does the repeated washing out of dye that was initially adsorbed into the fabric entail the wasteful use of large quantities of water and energy, but it results in poor color reproducibility among different dyed lots.

However, if the polyurethane elastic yarn left undyed, when the fabric is stretched, the internal polyurethane elastic yarn is brought to the surface, which detracts from the aesthetics and the color depth of the fabric, thereby leaving a demand for combinations of fiber raw materials that can be dyed to the same color, and this demand is especially strong for dark colors such as black used in fiber products. Furthermore, an additional demand exists for ways to change the color of fiber products, such as to dye the raw materials in blends using polyurethane elastic yarn to different colors.

One technology known to the prior art for dyeing elastic fibers involves adding pigments to the polyurethane spinning solution to produce spun-dyed yarn. See Japanese Unexamined Patent Application No. 2000-73233. Although such polyurethane elastic yarn containing pigments exhibits excellent colorfastness, the number of colors that can be used is limited and very costly, which limits its applications.

Another conventional dyeing technology involves the addition of an amine to elastic yarns such as polyurethane, and using the adsorption of acidic dyes or metal-containing dyes. However, in cases where their terminal group radical weight is low, adequate color density cannot be achieved, and conversely, when the amine terminal group radical weight is increased, due to the differing dye adsorption properties with the other fibers such as nylon that are in the blend, when dyeing with formulations of the three primary colors, different colors are produced, which makes color matching very difficult.

Yet another conventional dyeing technology involves the use of dye dispersions. Although the dispersed dyes produce good absorption in the polyurethane elastic yarn, the adsorptive strength of the dye remains weak, and it is impossible to obtain highly dense colors, or for the mid-density colors to remain colorfast during use. See Japanese Patent No. 3826377.

Further, another fiber structure involves the use of polyether-polyester block copolymer elastic fiber, which can be dyed with cationic dyes. However, because polyether-polyester block copolymer elastic fiber has a lower degree of elongation and inferior heat resistance compared with polyurethane elastic fiber, it is only rarely used. Japanese Unexamined Patent Application No. 2001-140167.

SUMMARY OF THE INVENTION

The objective of the present invention is to resolve the above-described problems associated with the prior art through the provision of a polyurethane elastic yarn and a method of production thereof, which exhibits alkali resistance, resistance to various chemical agents, high resilience, high strength and elongation, high heat resistance and the capability of being dyed with colorfast cationic dyes, and further, which provides highly aesthetic fabrics when used in blends.

The means below have been adopted to achieve the foregoing objectives for the polyurethane elastic yarn according to the present invention.

Polyurethane elastic yarn generally have the primary structural components of polymer diol and diisocyanate, wherein said polyurethane elastic yarn includes a polymer which contains sulfonate groups, and the molar concentration of the monomer that has sulfonate groups is at least 5 mol %.

Further, in the method of production of the polyurethane elastic yarn according to the present invention, polymer which contains sulfonate groups is added to the solution of polyurethane having primary structural components of polymer diol and diisocyanate, and spinning is performed.

The polyurethane elastic yarn according to the present invention is alkali resistant, resistant to various chemical agents, highly resilient, exhibits high strength and elongation, highly heat resistant, and capable of being dyed with colorfast cationic dyes, which makes the elastic yarn well suited for use in clothing, where it delivers ease of putting on and removal, good fit, a tight feel, resistance to color change, and a quality appearance. Further, in blends of the polyurethane elastic yarn of the present invention with other types of cationic dye dyeable fibers, each is dyed to the same color to provide excellent depth of color. Further, when the polyurethane elastic yarn according to the present invention is blended with fibers dyeable with acidic dyes, not only is there no contamination from the acidic dyes and the achievement of excellent colorfastness, but by using both acidic dyes and cationic dyes, it is possible to generate different colors to produce products having a unique coloration.

DETAILED DESCRIPTION

The polyurethane used in the present invention is not particularly limited so long as its primary structural components are a polymer diol and diisocyanate. There are also no special limitations on the method of its synthesis.

For example, a polyurethane comprising a polymer diol, a diisocyanate and a low molecular weight diamine may be used; or a polyurethane comprising a polymer diol, diisocyanate and a low molecular weight diol also may be used. A polyurethane that uses compounds containing hydroxyl groups or amino groups as chain-lengthening agents may be used as well. It is further preferable to use a multifunctional glycol, isocyanate, etc. with three or more functional groups in amounts that will not detract from the effects of the present invention.

For purposes of the present invention, what is meant by "primary structural components" are the components that constitute 50 wt % or more of the structural components used when forming the polyurethane.

Here, a typical structural unit which constitutes the polyurethane used in the present invention shall be described.

The preferred polymer diols of the structural units that comprise the polyurethane are polyether-type glycols, polyester-type glycols, polycarbonate diols, etc. Further, from the perspective of adding pliability and elongation properties to the yarn, the use of a polyether-type glycol is especially preferred.

Thus, it is preferable that the polyether-type glycol includes a copolymer diol compound containing the structural unit shown in General Formula (I).

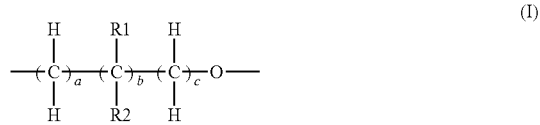

(I)

In the Formula I, a and c are integers of 1-3, b is an integer of 0-3, R1 and R2 are H or an alkyl group with from 1 to 3 carbon atoms.

Specific examples of such polyether-based diol compounds include polyethylene glycol, modified polyethylene glycol, polypropylene glycol, polytrimethylene ether glycol, polytetramethylene ether glycol (hereinafter abbreviated PTMG), modified PTMG that is a copolymer of tetrahydrofuran (hereinafter abbreviated THF) and 3-methyl-THF, modified PTMG that is a copolymer of THF and 2,3-dimethyl-THF, modified PTMG that is a copolymer of THF of neopentyl glycol, a copolymer of THF and ethylene oxide and/or propylene oxide randomly copolymerized in an irregular array, and so forth. A single type of such polyether-based glycols, or combinations of two or more types of them may be used in the form of mixtures or copolymers. Preferred among them are PTMG and modified PTMG.

Further, from the perspective of improving the resistance of the polyurethane yarn to abrasion and light, it is preferable to use polyester-based glycol such as polyester diol with side chains produced by means of condensation polymerization of a mixture of butylene adipate, polycaprolactone diol, 3-methyl-1,5-pentane diol and polypropylene polyol with adipic acid, etc.; or a polycarbonate diol that has dicarboxylic acid ester units that are derived from dicarboxylic acid components comprising 3,8-dimethyl decane dioxide and/or 3,7-dimethyl decane dioxide.

Further, said polymer diol may be used alone, or in mixtures or copolymers of two or more types.

In order to obtain the desired levels of elongation, strength, heat resistance and the like of the elastic fibers, the molecular weight of the polymer diol used in the present invention should range between 1000 and 8000, preferably between 1800 and 6000. Using a polymer diol within this range of molecular weight allows the achievement of excellent elongation, strength, elastic recovery, and heat resistance.

Next, examples of aromatic diisocyanate structural units which constitute the polyurethane, which especially allow the synthesized polyurethane to exhibit high heat resistance and strength, include such aromatic diisocyanates as diphenyl methane diisocyanate (hereinafter abbreviated MDI), trilene diisocyanate, 1,4-diisocyanate benzene, xylene diisocyanate, 2,6-naphthalene diisocyanate, etc. Examples of alicyclic diisocyanates include methylene bis(cyclohexyl isocyanate), isophorone diisocyanate, methyl cyclohexane-2,4-diisocyanate, methyl cyclohexane-2,6-diisocyanate, cyclohexane-1,4-diisocyanate, hexahydroxylene diisocyanate, hexahydrotolylene diisocyanate, octahydro-1,5-naphthalene diisocyanate, etc. Aliphatic diisocyanates also may be used, which are effective in suppressing yellowing in the polyurethane yarn. These diisocyanates may be used alone, or in combinations of two or more types.

Next, it is further preferable to use at least one type of a low molecular weight diamine or a low molecular weight diol as a chain elongating agent in the structural units of the polyurethane. It is also possible to use compounds such as ethanol amine that have hydroxyl and amino groups within their molecules.

Examples of preferred low molecular weight amines include ethylene diamine (hereinafter abbreviated EDA), 1,2-propane diamine, 1,3-propane diamine, hexamethylene diamine, p-phenylene diamine, p-xylene diamine, m-xylene diamine, p,p'-methylene dianiline, 1,3-cyclohexyl diamine, hexahydro methaphenylene diamine, 2-methyl pentamethylene diamine, bis(4-aminophenyl) phosphine oxide, etc. It is preferable to use one or more types from among this group, with ethylene diamine being especially preferred. The use of ethylene diamine allows the achievement of yarn having excellent elongation, elastic recovery and heat resistance. To these chain lengthening agents it is further possible to add a triamine compound such as diethylene triamine, which can form a crosslinked structure, in amounts that will not detract from the effects.

Further, typical examples of low molecular weight diols include ethylene glycol (hereinafter abbreviated EG), 1,3-propane diol, 1,4-butane diol, bishydroxy ethoxy benzene, bishydroxy ethylene terephthalate, 1-methyl-1,2-ethane diol, etc. One or more of these may be used. Especially preferred among them are ethylene glycol, 1,3-propane diol and 1,4-butane diol. When used, diol-lengthened polyurethane yarn that exhibits high heat resistance and strength can be obtained.

Further, from the perspective of obtaining fibers with good longevity and high strength, the molecular weight of the polyurethane elastic yarn obtained in the present invention should range from a number-averaged molecular weight of 40000 to 150000. The number-averaged molecular weight is determined by GPC measurements and conversion in terms of polystyrene.

From the perspectives of obtaining good processing throughput, having no practical problems, and excellent resistance to high heat, especially preferred as the polyurethane comprising the elastic yarn of the present invention are those from diol and diisocyanate which have a melting point on the high temperature side that ranges from 150° C. to 300° C. Here, what is meant by the high temperature side melting point is the melting point of the so-called hard segment crystal melting point of the polyurethane or polyurethane urea when measured by DSC.

To with, when manufactured from polyurethane having a high side melting point of from 150° C. to 300° C. by using PTMG with a number-averaged molecular weight of from 1000 to 8000 as the polymer diol, MDI as the diisocyanate, and a chain lengthening agent selected from one or more of ethylene glycol, 1,3-propane diol, 1,4-butane diol, ethylene diamine, 1,2-propane diamine and 1,3-propane diamine, the elastic yarn will exhibit a high degree of elongation, and further, it will deliver good process throughput, present no practical problems, and provide excellent resistance to heat as described above.

The polyurethane elastic yarn according to the present invention incorporates a polymer that contains sulfonate groups. Polymers that contain sulfonate groups have an anionic charge, which, in the spinning solution, delivers good interaction with the urea groups and the urethane groups of the polyurethane, which helps to prevent the agglomeration of the hard segments, and reduces viscosity changes and gelation in the spinning solution. Further, when the polymer containing said sulfonate groups is included in the polyurethane elastic yarn, it covers and protects the crystals which are primarily hard segments, and serves to prevent the non-crystalline areas which are primarily soft segments from being oxidized, to thereby deliver high resistance to chemical agents, high resilience, and high heat resistance, as well as to make possible its ionic bonding with cationic dyes thereby enabling it to be dyed with colorfast cationic dyes. By contrast, when the polyurethane elastic yarn contains no polymer having sulfonate groups, it is difficult to raise its resistance to alkalis and chemical agents, its recovery, high strength stretch, heat resistance and capability for dyeing with cationic dyes.

What is meant by sulfonate group-containing polymer for purposes of the present invention is not confined to compounds obtained from the polymerization of compounds that contain sulfonate groups as monomers; it also is possible to use a compound containing sulfonate groups as one monomer, and copolymerize it with another monomer.

From the perspective of obtaining polyurethane yarn having a high resistance to chemical agents and high strength and elongation, the molar concentration of the sulfonate group-containing monomer should be 5 mol % or higher. When such molar concentration is 5 mol % or higher for the sulfonate group-containing monomer in the polyurethane elastic yarn, anti-oxidation properties similar to those afforded by a phenol-type antioxidant can be realized, along with high resistance to heat aging. Preferably, that concentration should be 10 mol % or higher, with 20 mol % or higher being especially preferred. The upper limit may even be 100 mol %, so long as it does not impair the spinning properties or the elongation of the polyurethane elastic yarn.

Also, from the perspective of realizing high spinning speeds and suppressing the weight reduction from volatilization, the number-averaged molecular weight of the polymer containing the sulfonate groups should range from 2000 to 500000.

From the perspectives of achieving good spinning properties, a good balance among mechanical properties and heat resistance, the amount of the polymer containing the sulfonate groups with respect to that of the polyurethane elastic yarn of the present invention preferably falls within a range from 0.5 wt % to 50 wt %, and from the perspective of reducing the drop in the elastic resilience of the polyurethane yarn, it is preferable that it fall within a range from 1 wt % to 30 wt %. To add further detail, the $SO_3H$ concentration in the fibers should range from 0.12 wt % to 3.6 wt %.

Aromatic sulfonates and vinyl sulfonates are examples of compounds that contain sulfonate groups. From the perspective of obtaining polyurethane yarn with high strength and elongation, it is preferable to use an aromatic sulfonate. Among them, benzene sulfonate and phenol sulfonate are especially preferable due to their ability to efficiently bring out high resilience, high heat resistance and capability of being dyed with colorfast cationic dyes.

When copolymers are formed with polymers containing sulfonate groups, there are no particular restrictions upon the molar ratios of the other constituent monomers, but the other constituent monomers should be selected appropriately from the perspective of their stability and compatibility with polyurethane. Compounds containing sulfonyl groups are advantageous for stability. Here, what is meant by compounds having sulfonyl groups are ones that do not include sulfonic acid.

Such compounds that contain sulfonyl groups (excluding sulfonic acid) should be ones highly compatible with polyurethane and which do not impede the crystallization of the hard segments in the polyurethane; bulky compounds are preferable to lend high strength and elongation properties to the polyurethane. For this, compounds having aromatic rings, such as aromatic sulfones, are suitable. Especially preferred among them are bis-phenols such as dihydroxy diphenyl sulfone. When a bis-phenol such as dihydroxy diphenyl sulfone is used, it is possible to impart dramatically improved anti-oxidation properties, and it also contributes to high heat resistance and capability to be dyed with colorfast cationic dyes.

Examples of polymers containing sulfonate groups include a formaldehyde condensation polymer of benzene sulfonate, a formaldehyde condensation polymer of phenol sulfonate, a formaldehyde condensation polymer of phenol sulfonate and cresol, an addition polymer of ethylene sulfonate and styrene, an addition polymer of propylene sulfonate and styrene, an addition polymer of styrene sulfonate and styrene, an addition polymer of benzene sulfonate and divinyl benzene, an addition polymer of phenol sulfonate and divinyl benzene, an addition polymer of benzene sulfonate and divinyl benzene sulfonate, an addition polymer of phenol sulfonate and divinyl benzene sulfonate, an addition polymer of benzene sulfonate and divinyl sulfone, an addition polymer of phenol sulfonate and divinyl sulfone, a formaldehyde condensation polymer of benzene sulfonate and 4,2'-dihydroxy diphenyl sulfone, a formaldehyde condensation polymer of phenol sulfonate and 4,2'-dihydroxy diphenyl sulfone, a formaldehyde condensation polymer of benzene sulfonate and 4,4'-dihydroxy diphenyl sulfone, a formaldehyde condensation polymer of phenol sulfonate and 4,4'-dihydroxy diphenyl sulfone, etc. Among them, the formaldehyde condensation polymers are preferable due to the high resilience and the transparency and color of the yarn after spinning.

There are no particular restrictions upon the polymerization method used to produce the sulfonate group-containing polymers; they may be produced using condensation polymerization such as formaldehyde bringing of addition polymerization using vinyl-based sulfonates such as (a) styrene derivatives having sulfonate groups such as styrene sulfonate, α-methyl styrene sulfonate; (b) olefin sulfonates such as ethylene sulfonate, propylene sulfonate, butylene sulfonate; and (c) diene sulfonates such as butadiene sulfonate. To protect sulfonate groups, which bring out the anionic characteristics of the polymer, it is preferable to select a starting monomer as well as a precursor such as an appropriate sulfonate or sulfonamide, and to polymerize this starting substance, before later deriving sulfonate groups from all or part of it by ion exchange using an acid. Further, in the case of condensation polymerization by formaldehyde crosslinking, one may preferably produce either a Novolac type by condensation polymerization of formaldehyde in the presence of an acidic catalyst, or to produce a resol type in the presence of an alkali catalyst. From the perspective of the stability of the polymer which contains sulfonate groups, in other words, controlling its viscosity and color changes, it is preferable to add and react monoamine end-capping agents such as dimethyl amine, diisopropyl amine, ethylmethyl amine, diethyl amine, butylmethyl amine, dibutyl amine, diamyl amine, etc. in amounts equivalent to the $SO_3H$.

Preferred among them, from the perspectives of stabilizing the viscosity of the raw material solution for spinning the polyurethane yarn, obtaining good spinning characteristics and obtaining high resistance to chemical agents, the sulfonate group-containing polymer should be a random or alternating copolymer from a sulfonate group-containing compound and a compound containing sulfonyl groups (excluding sulfonic acid). Further, from the perspective of achieving good mechanical properties in the polyurethane yarn, it is preferable that the copolymer be produced from monomers of a compound containing sulfonate groups and a compound containing sulfonyl groups (excluding sulfonic acid). Examples would include formaldehyde condensation polymer of benzene sulfonate and 4,4'-dihydroxy diphenyl sulfone, and formaldehyde condensation polymer of phenol sulfonate and 4,4'-dihydroxy diphenyl sulfone.

The polymer which contains sulfonate groups used in the present invention is highly reactive with cationic dyes, and exhibit the capability to be dyed with colorfast cationic dyes, but one may further add anionic groups other than the sulfonate groups to further improve dyeability with cationic dyes.

Such anionic groups include nitro groups, carboxyl groups, phosphate groups, or those in which the terminals are capped with a metal salt, etc., which is a counter cation. Carboxyl groups are especially preferred as the anionic group. Employing them makes it possible to reduce the amount of the sulfonate group-containing polymer that is added. When carboxyl groups are to be introduced to the polymer which contains sulfonate groups, monomers that can provide the carboxyl groups include acrylic acid, methacrylic acid, maleic acid, maleic acid monoesters, itaconic acid, itaconic acid monoesters, etc.

In general, since sulfonate groups or their salts are introduced into the polymer structure of fibers to be dyed with cationic dyes (cationic dye dyeable polyester fibers, acrylic fibers, etc.), in order to achieve similar adhesion behavior among the dyes, when dyeing cationic dye dyeable polyester fibers or acrylic fibers with a mixture of cationic dyes, it is preferable to also add the same types of anionic groups or their salts.

The amount of the compound containing anionic groups required by the sulfonate groups in the polyurethane elastic yarn of the present invention may be attained by adding the amount of terminal groups to generate good dye coloration, but considering stretch properties, it is preferable that the amount range from 0.1 wt % to 50 wt %. When the amount of the anionic groups required by the sulfonate groups in the polymer for the polyurethane elastic yarn exceeds 50 wt %, spinning properties can deteriorate.

Further, the amount of sulfonate groups in the polyurethane elastic yarn that is required to generate adequate dye coloration should range from 10 millimoles/kg to 500 millimoles/kg, preferably from 20 millimoles/kg to 300 millimoles/kg. If the amount is too low, dye adsorption will be inadequate, and if too much is used, even though no problems in dye coloration will result, dye saturation can occur and spinning and other properties can be adversely affected.

On the other hand if the molar ratio of sulfonate groups is too low with respect to the anionic group-containing compound that is required by the sulfonate groups in the polymer, the amount of polymer in the polyurethane elastic yarn may be 50 wt % or more of in order to attain the 10 millimoles/kg of the sulfonate groups in the polyurethane elastic yarn, which, as previously mentioned, can adversely affect spinning properties. Accordingly, if the primary objective is to perform dyeing using cationic dyes, it is better to limit the content of this polymer in the polyurethane elastic yarn, from the perspective of spinning properties. In that case, one method of increasing the quantity of sulfonate groups in the polymer is to use an addition polymer wherein a vinyl-based sulfonate, of which the molecular weight of the monomer is relatively low in the aromatic sulfonate monomer, is used as a starting material.

Further, from the perspectives of the sulfonate group-containing polymer used in the present invention being speedily dispersed or dissolved in the polyurethane, achieving the target characteristics in the polyurethane fibers produced, obtaining polyurethane having an appropriate degree of transparency, and preventing the sulfonate group-containing polymer from diminishing in content, being affected by heat during the spinning process and discoloration, it is preferable to perform it in a 20 wt % solution of N,N'-dimethyl acetoamide (hereinafter abbreviated DMAc) or N,N'-dimethyl formamide (hereinafter abbreviated DMF) with a viscosity between 10 cP and 10000 P at 20° C. to prevent or reduce the discoloration of the polymer itself.

It is further preferable for the polyurethane used in the present invention to use one or more types of end-capping agent in its preparation. Preferable end-capping agents include mono-amines such as dimethyl amine, diisopropyl amine, ethylmethyl amine, diethyl amine, methylpropyl amine, isopropyl methyl amine, diisopropyl amine, butylmethyl amine, isobutyl methyl amine, isopentyl methyl amine, dibutyl amine, diamyl amine; mono-ols such as ethanol, propanol, butanol, isopropanol, allyl alcohol, cyclopentanol; and monoisocyanates such as phenyl isocyanate.

A variety of stabilizers and pigments may also be incorporated into the polyurethane elastic yarn or the polyurethane spinning solution. Examples include photoinhibitors, antioxidants, hindered phenol agents such as 2,6-di-t-butyl-p-cresole (BHT) and "Sumilizer-GA-80™" by Sumitomo Chemical Industries, KK.; various types of benzotriazoles such as Ciba Geigy's Cinubin™; benzophenone agents, phosphorous agents such as "Sumilizer-P-16" ™; various types of hindered amines, pigments such as iron oxide and titanium oxide; inorganic substances such as zinc oxide, cerium oxide, magnesium oxide and carbon black; fluorine-based and silicone-based resin powders, metallic soaps such as magnesium stearate; or sanitizers, deodorizers, etc. that contain silver, zinc or compounds thereof; lubricants such as silicone and mineral oil; and various anti-static agents such as barium sulfate, cerium oxide, betaines, phosphates types, etc., which may be added or reacted with the polymer. It is further preferable to increase the resistance to light and various nitrogen oxides, using a nitrogen oxide scavenger such as HN-15 made by Nippon Hydrazine, Co. Ltd.

Further, fine particles of metal oxides such as titanium oxide and zinc oxide may be added to achieve increased spinning speeds during the dry spinning process. Further, inorganic substances or inorganic porous material (such as bamboo charcoal, wood charcoal, carbon black, porous mud, clay, silica earth, coconut husk activated carbon, active carbon from coal, zeolite, pearlite, etc.) may be added in amounts that do not detract from the effects of the invention to improve heat resistance and mechanical properties.

These as well as other additives may be added to the polyurethane solution as modifying agents to adjust the spinning solution, or they may be added beforehand to the polyurethane solution or dispersion. The contained quantity of such additives should be appropriately determined based upon the objectives for their addition.

Next, the method of production of polyurethane elastic yarn according to the present invention shall be explained in detail.

When preparing the polyurethane with the primary structural components of polymer diol and diisocyanate into polyurethane elastic yarn according to the production method of the present invention, the aforementioned polymer which contains sulfonate groups must be incorporated. Said sulfonate group-containing polymer may be added at the polyurethane polymerization stage, but for purposes of the present invention, it is best to add it after first preparing the polyurethane solution.

The production of the polyurethane solution or the polyurethane which is the dissolved substance in this solution may be accomplished by melt polymerization or solution polymerization methods, or by other methods. However, solution polymerization is preferable. In the case of using solution polymerization, gels or other foreign materials are not produced in the polyurethane, which makes spinning easier, and facilitates the production of low-fiber polyurethane yarn. The use of solution polymerization has the further advantage of eliminating the step of making a solution.

A preferred polyurethane for use in the present invention is one that uses PTMG with a number-averaged molecular weight that ranges from 1000 to 8000 as the polyol, MDI as the diisocyanate, and further at least one type of chain lengthening agent selected from 1,3 propane diol, 1,4-butane diol, ethylene diamine, 1,2-propane diamine and 1,3-propane diamine, of which the melting point on the high temperature side is in the range from 200° C. to 300° C.

Said polyurethane may be synthesized with the aforementioned raw materials in a solvent primarily composed of DMAc, DMF, dimethyl sulfoxide, N-methylpyrrolidone, etc. For example, preferred methods include adding the various raw materials to the solvent and dissolving, followed by heating to an appropriate temperature and reacting to produce the polyurethane using the so-called one-shot method, or a method whereby the polymer diol and the diisocyanate are first melt-reacted, then the reaction product is dissolved in a solvent and reacted with the aforementioned diol to produce the polyurethane.

When a diol is used as a chain lengthening agent, a typical method to produce a polyurethane with a high temperature side melting point between 150° C. and 300° C. would be to control the types and the ratio among the polymer diol, the MDI and the diol. For example, when using a low molecular weight polymer diol, it is possible that by using a relatively higher ratio of the MDI, a polyurethane with a higher high temperature side melting point can be obtained. Similarly, when using a low molecular weight diol, the relative amount of the polymer diol can be reduced to obtain a higher high temperature side melting point polyurethane. When the number-averaged molecular weight of the polymer diol is 1000 or more, the molar ratio (number of moles of MDI)/(number of moles of polymer diol) must be 1.5 or greater to achieve a high temperature side melting point of 150° C. or higher.

When synthesizing such polyurethane, one or more types of an amine-based catalyst or organometallic catalyst should be employed.

Examples of amine-based catalysts include N,N-dimethyl cyclohexyl amine, N,N-dimethyl benzyl amine, triethyl amine, N-methyl morpholine, N-ethyl morpholine, N,N,N',N'-tetramethyl ethylene diamine, N,N,N',N'-tetramethyl-1,3-propane diamine, N,N,N',N'-tetramethyl hexane diamine, bis-2-dimethyl aminoethyl ether, N,N,N',N',N'-pentamethyl diethylene triamine, tetramethyl guanidine, triethylene diamine, N,N'-dimethyl piperazine, N-methyl-N'-dimethyl aminoethyl piperazine, N-(2-dimethyl aminoethyl) morpholine, 1-methyl imidazole, 1,2-dimethyl imidazole, N,N-dimethyl aminoethanol, N,N,N'-trimethyl aminoethyl ethanol amine, N-methyl-N'-(2-hydroxyethyl)piperazine, 2,4,6-tris(dimethyl aminomethyl) phenol, N,N-dimethyl aminohexanol, triethanol amine, etc.

Examples of organometallic catalysts include tin octanoate, dibutyl tin dilaurate, dibutyl lead octanoate, etc.

It is preferable that the concentration of the polyurethane solution obtained in this manner in the range from 30 wt % to 80 wt %.

It is further preferable in the present invention to add the above-described polymer-containing sulfonate groups to the polyurethane solution. Any desired method may be used for making this addition. Typical methods include the static mixing method, the mixing method, the homogenization method, or using a dual axis extruder. Here, from the perspective of making a uniform addition to the polyurethane solution, adding the sulfonate group-containing polymer in solution form is most desirable.

There are cases when making this addition of the sulfonate group-containing polymer to the polyurethane solution causes the viscosity of the polyurethane solution to increase above its pre-addition viscosity, and from the perspective of preventing this, it is preferable to add one or more types of an end-capping agent, including a mono-amine such as dimethyl amine, diisopropyl amine, ethylmethyl amine, diethyl amine, methylpropyl amine, isopropylmethyl amine, diisopropyl amine, butylmethyl amine, isobutylmethyl amine, isopentylmethyl amine, dibutyl amine, diamyl amine, etc; a mono-ol such as ethanol, propanol, butanol, isopropanol, amyl alcohol, cyclopenatanol, etc.; or a mono-isocyanate such as phenyl isocyanate, etc.

The above described light blockers, antioxidation agents, other reagents or pigments may be added to the polyurethane solution at the same time that the sulfonate group-containing polymer is added.

The polyurethane solution with the above described composition may then be spun using either dry method spinning, wet method spinning or melt spinning to obtain the polyurethane elastic yarn according to the present invention. From among the above, dry method spinning is preferred due to its spinning stability and the ability to obtain thick or very fine yarn.

There are no particular limitations upon the fineness, the number of monofilaments, or the cross-sectional shape of the spun polyurethane elastic yarn according to the present invention. It may, for example, be spun into a monofilament single strand or into a multifilament yarn comprised of a plurality of filaments. The cross-sectional shape of the yarn may be round or flat.

Further, the spinning method used is not limited to dry spinning, and the spinning conditions may be selected appropriately according to the desired characteristics and the spinning equipment to select the type of spun yarn.

Also, since the set characteristics (permanent warp) and the stress relaxation characteristics of the polyurethane elastic yarn of the present invention are easily affected by the speed ratio of the Godet roller and the reel, these should be set appropriately for the application. Thus, from the perspective of obtaining polyurethane elastic yarn with the desired set and stress relaxation characteristics, the speed ratio between the Godet roller and the reel should range from 1.15 to 1.65. From the perspective of achieving low set and low reactivity polyurethane elastic yarn, the speed ratio between the Godet roller and the reel should range 1.15 to 1.40, preferably from 1.15 to 1.35. On the other hand, should high set properties and high stress relaxation be desired in the polyurethane elastic yarn, the speed ratio between the Godet roller and the reel should be set between 1.25 and 1.65, preferably between 1.35 and 1.65.

It is further possible to use a high spinning speed to improve the strength of the polyurethane elastic yarn, and in practical terms, a spinning speed of 450 m/minute or higher will produce a desirable strength level. From the perspective of industrial productivity, the speed should range from 450 to 1000 m/minute.

The polyurethane elastic yarn obtained in the manner described above may be blended with other fibers to prepare stretchable fabric. There are no particular restrictions upon the form of the stretchable fabric, its mixture ratio, the raw fibers with which it is combined and the blending method. Means known to the art may be used in preparing the fabric. The polyurethane elastic yarn may also be used by itself or it may be covered with one or more types of other synthetic fibers such as polyamide fibers, polyester fibers or acrylic fibers, or with natural fibers such as cotton, hemp and wool using conventional methods.

Also, fabric containing the polyurethane elastic yarn of the present invention may preferably be blended with other fibers including nylon and other polyamide synthetic fibers; with polyester copolymer synthetic fibers primarily containing polyethylene terephthalate, polytrimethylene terephthalate, polybutylene terephthalate, etc.; with acrylic synthetic fibers, with polypropylene synthetic fibers, with semi-synthetic fibers typified by acetate fibers, or with natural fibers such as cotton or wool.

The polyurethane elastic yarn of the present invention has the properties that it is dyeable with cationic dyes, but difficult to dye with acidic dyes. Other fibers known to be dyeable with cationic dyes include acrylic synthetic fibers, wool, cationic dye dyeable polyester fibers, etc., which, when combined with the polyurethane in blended fabrics, make possible the dyeing of said fabric using a single dyeing process. In blends with acidic dyeable fibers such as polyamide fibers, silk or wool, since the acidic dyes will not adhere to the polyurethane elastic yarn of the present invention, the phenomenon of cross-dyeing contamination can be suppressed, and excellent colorfast dyeing can be achieved using separate processes. Further, it is possible to use a different color of cationic dye than was used for the acidic dye to produce different colors in the fabric.

There are no particular limitations upon the dyeing method; a continuous dyeing process may be used with a low bath ratio, or batch dyeing can be performed with a liquid reflux dyeing machine, wince dyeing machine, jigger dyeing machine, beam dyeing machine or cheese dyeing machine. Conventional print technology can also be used to print precision patterns on the fabrics.

In dyeing the polyurethane elastic yarn according to the present invention, the usual cationic dyes may be employed in the dyeing method. To with, the dye temperature should range between from 80 to 135° C., preferably between from 100 to 130° C., with the use of uniform dyeing agents, pH modifiers, bath softeners and the like. For example, in performing dyeing on a cationic dyeable polyester fiber blend, 2-3 g/L of Glauber's salt should be added in order to prevent diminished strength. After dyeing, a surfactant can be employed in the wash process. There are no particular restrictions upon the dye types used for the dye colors or their chemical structure, but from the perspective of achieving dye balance for mid-density colors, it is preferable to use a dispersion type of cationic dye, and for dark colors such as blacks and navy blues, raw cationic dyes are preferable due to their excellent color buildup properties.

When the polyurethane elastic yarn of the present invention is to be dyed with a black cationic dye, $L^* \leq 20$ dyeing properties are easily obtained. $L^*$ is a color density value based on the CIE1976$L^*a^*b^*$ color coordinate system. There are two types of cationic dyes, the raw cationic dyes which have excellent color density, and the dispersion type cationic dyes which have excellent handling properties in the dyeing process. Commercially available black cationic dyes which have high dyeing capacity and are well suited to the present invention include Hodogaya Chemicals Aizen Catilon™ Black CD-BLH, Black SH200%, Black MH, Black KBH, Black NH200%, Black AWH Liquid, Black BH Liquid; Deister Co. Astrazon™ Black FDL Liquid, SW200%, Black SW Liquid; "Dyeacryl" ™ Black ESL-N, Black NSL-N200%, Black CSL-N200%, Black VS-N, Black SWR-N Liquid; Nippon Kayaku Co. "Kayacryl" ™ Black NP200, Black NL, etc. A selection from the above black cationic dyes will deliver good dyeing capacity, and these should be used in amounts of 5.0% owf with respect to the raw fabric in a dye bath adjusted to pH 4.5 at 10° C. for 60 minutes. In actual fabric dyeing, commercially available cationic dyes other than the ones cited above may be used; a dispersion type cationic dye may be used as may a plurality of dyes formulated together.

The sulfonate group-containing polymer, depending upon the types of monomers used to prepare it and their purity, and the method of polymerization, can lend a brown coloration to the system. When using a sulfonate group-containing polymer that is so colored, it will color the polyurethane fibers, and in certain cases, it can cause their use to be restricted. Accordingly, it is preferable in the present invention that the sulfonate monomers be highly pure and selected from ones that cause little discoloration. The polymerization time and temperature also need to be considered in advance. Specifically, the b-value shown on a Hunter type colorimeter should be less than 15, preferably less than 3, else there be too much brown discoloration. The b-value should be measured with the Hunter colorimeter 24 hours after spinning, and it should be wound lightly, under a small load, in order that the color of the test sample not be affected.

EXAMPLES

Examples of the invention shall be presented to describe it in more detail.

The evaluation methods for the polyurethane elastic yarn of the present invention shall be described for the strength, degree of elongation, set, stress relaxation, chemical resistance, alkali resistance, heat resistance (heat softening and melting points), color measurement method, as well as the dye adhesion, washing colorfastness, and appearance of the dyed fabric for black cationic dye.

Set Properties (Permanent Strain Rate), Stress Relaxation, Strength and Elongation An Instron Model 4502 tensile strength test apparatus was used to measure the set properties, stress relaxation, strength, and degree of elongation of the polyurethane elastic yarn.

A 5 cm length (L1) of test sample was drawn at the rate of 50 cm/min. repeatedly 5 times to an elongation of 300%. At the 300% elongation, the stress (G1) was measured. Next, that 300% elongation was held for 30 seconds, and then a second stress measurement (G2) was taken. Then, the sample was allowed to recover from the elongation until the stress was 0, and a second length measurement (L2) was taken. Then, the sample was elongated a sixth time to breakage. The stress (G3) at the time of breakage and the sample length (L3) at the time of breakage were measured. The above characteristics were used to compute the foregoing properties with the formulas listed below.

Strength $(cN)=(G3)$

Stress relaxation $(\%)=100\times((G1)-(G2))/(G1)$

Set $(\%)=100\times((L2)-(L1))/(L1)$

Elongation $(\%)=100\times((L3)-(L1))/(L1)$

Chemical Resistance

The yarn was fixed at an elongation of 100% and underwent three types of exposure processes. First, it was immersed in a 5 wt % solution of oleic acid in hexane for an hour. Next, it was immersed for two hours in a hypochlorite solution (chlorine concentration 500 ppm), followed by a 2-hour exposure to UV light. The UV light exposure was performed using a carbon arc type of fade meter made by Suga Corp, which was implemented at 63° C. and 60% relative humidity. After implementing these exposure treatments twice, the yarn was left to stand for 24 hours at room temperature, and then the elongation to breakage rate (G4) was measured, and the percentage of retention of original properties was used to determine chemical resistance.

Chemical Resistance $(\%)=100\times(G4)/(G3)$

Alkali Resistance 1

The alkali resistance of the polyurethane yarn was assessed by treating it in the way polyester fibers are treated for weight reduction, and the retention of the original breakage strength was used for evaluation.

The yarn was fixed at 100% of elongation and sealed in a pressure vessel filled with an aqueous solution containing a cationic weight reduction agent (quaternary ammonium salt, DXN-10 made by Ippo Corp.) and sodium hydroxide (8.0 wt % each). After treating for 120 minutes at 100° C., the yarn was left to stand for 24 hours at room temperature, and then the method described above was used to measure the strength to breakage (G5). The strength retention rate compared to the untreated yarn's strength to breakage (G3) was computed as a percentage for the strength to breakage (G5) to assess its alkali resistance.

Alkali Resistance $(\%)=100\times(G5)/(G3)$

Alkali Resistance 2

As a measure of the alkali resistance of the polyurethane yarn, it was treated assuming the anti-staining treatment used for polyester fibers, and evaluated in terms of retention of its retention of the original strength to breakage.

The yarn was fixed at 100% of elongation and immersed in an aqueous solution of a cationic weight reduction agent (8.0 wt %) (quaternary ammonium salt, DXN-10 made by Ippo Corp.) containing 40% sodium hydroxide. After treating for 120 minutes at 100° C., the yarn was left to stand for 24 hours at room temperature, and then the method described above was used to measure the strength to breakage (G6). The strength retention rate compared to the untreated yarn's strength to breakage (G3) was computed as a percentage for the strength to breakage (G6) to assess its alkali resistance.

Alkali Resistance $(\%)=100\times(G6)/(G3)$

Heat Softening Point

The heat softening point was measured to assess the heat resistance of polyurethane yarn. An RSA II dynamic elasticity measuring device by Rheometrics Co. was used with a heat elevation rate of 10° C./min. to measure the temperature dispersion for the dynamically stored elasticity rate E'. The E' curve for the heat softening point was plotted from 80° C. to 130° C., and at the point above 160° C. where E' fell due to heat softening was used to determine the value. E' was plotted on a logarithmic axis and temperature on a linear axis.

Polyurethane Elastic Yarn Color Tone

Since brown discoloration often occurs, the measurement of the b-value was used as the standard. Test samples were placed on a 5×5 cm sample plate for 24 hours after spinning the yarn with a minimal load (1.05 in terms of draft rate) placed on it during winding for the precision determination of any affects on color. The samples along with a standard white surface (JIS Z 8722:2005, paragraph 4.3.4) were measured, when laid flat tightly atop a glass plate, and the average values were taken.

The measurement of the b-value was done according to JIS L 1013:2005 C method (Hunter method) using a Hunter type colorimeter and computed using the equation below. The average of 5 measurements was used.

$b=7.0(Y-0.847Z)/Y^{1/2}$ (wherein X, Y and Z were computed according to JIS Z 8701:2005)

The results for b were graded as A when it was under 3, B when it was from 3 to under 15, C when it was from 15 to under 25, and D when it was 25 or higher.

Dyeing Adherence of Black Cationic Dye

A 29-gauge single opening tubular knitting machine (equipped with a rotary feed device for the polyurethane elastic yarn) was used to knit with a 50% elongation to prepare a fabric knitted from 100% polyurethane elastic yarn. To prevent fraying, the ends of the knitted fabric were knitted together with a small amount of nylon filament (78 decitex 24 filament) made by Toray (Ltd.), which cannot be dyed with cationic dyes.

Next, the tubular knitted fabric was heat-set in a non-elongated state by heating at 190° C. for 60 seconds, and then, it was finished in a bath ratio of 1:20 at 80° C. for 20 minutes using a 0.1 wt % solution of Sunmol™ (Nicca Chemical Co. Ltd.) WX24 finishing agent to extract the oils from the fibers. After finishing, the tubular knitted fabric was placed in a 300 cc stainless steel dyeing pot, and dyed at a bath ratio of 1:20, at 110° C. for 60 minutes using 5% owf of a black cationic dye (Astrazon™ made by Deister KK Black FDL liquid using a Mini-color dyeing machine made by Tecsam Giken (Ltd.). The dye bath was controlled to a pH near 4.5 using 0.025 wt % acetic acid and 0.025 wt % sodium acetate. The dyed tubular knit fabric was washed and spun dry, and then dried at 160° C. for 60 seconds before being evaluated for dye adherence.

The tubular knitted fabric was folded flat into two layers and a spectrometer (Model CM-3600d by Konica-Minolta (Ltd.)) was used to measure the color in the CIE1976L*a*b* color coordinate system, wherein the lower the L* value, the deeper the color.

Colorfastness with Washing

The foregoing tubular knitted fabric used for the dyeing evaluation with the black cationic dye was used and the method of JIS L-0848:2005 A-2 was followed for evaluation. The color fading of the test sample was evaluated using a grey scale.

Quality of Appearance 1

Bare sheet fabric was prepared by knitting 29 gauge polyurethane elastic yarn with a single opening tubular knitting machine (equipped with a rotary feed device for the polyurethane yarn along with cationic dye dyeable polyester polymer fibers (56 decitex, 24 filament) made by Toray (Ltd.) with the polyurethane elastic yarn knitted at 50% elongation.

Next, the fabric was heat-set in an unstretched state at 190° C. for 60 seconds, and then, it was finished in a bath ratio of 1:20 at 80° C. for 20 minutes using a 0.1 wt % solution of Sunmol™ (Nicca Chemical Co. Ltd.) WX24 finishing agent to extract the oils from the fibers.

Then, the finished samples were dyed in a 300 cc capacity stainless steel dyeing pot at a bath ratio of 1:20, 110° C., for 60 minutes using 5% owf black dye of "Astrazon"™ made by Deister (Ltd.) black FDL liquid) with a Mini-color dyeing machine made by Texam Giken (Ltd.). The dye bath was maintained in the vicinity of pH 4.5 using 0.025 wt % of acetic acid and 0.025 wt % of sodium acetate. The dyed fabric was water washed and spun dry before drying at 160° C. for 60 seconds to obtain the samples of tubular knit fabric for the quality of appearance evaluation.

The appearance of the tubular knitted fabric was evaluated while pulling on the fabric to observe the color of the polyurethane elastic yarn. When the color was similar to that of the cationic dyed polyester copolymer fibers it was graded A (i.e. there were no spots of a different color (when the blended fabric is stretched to reveal the polyurethane elastic yarn whereupon compared with the other fibers (polyester, etc.) different colors of the polyurethane elastic yarn (such as white) tend to stand out as (white colored) spots on the surface of the fabric); when the colors were close, it was graded B (permissible deviation); and when the colors were different, it was graded D (non-permissible deviation).

Quality of Appearance 2

The following method was then used to prepare a stretch weave, which was treated with the alkali weight reduction processing and dye processing before evaluating the appearance.

Covering processing was first implemented on the polyurethane elastic yarn. The covering yarn for the warp strands was a regular polyester fiber, 168 decitex—48 filament, using a covering machine under conditions of a strand count=450T/m, draft=3.0 to prepare the covered yarn. Also, similar covered yarn was prepared using regular polyester fibers 168 decitex—48 filament with a covering machine under the condition of a strand count of 700 T/m, draft=3.5.

Next, warp weaving was performed with 5100 woof strands (with 1100 strands of rough-wound warp strands) with a pasted warp using a rapier loom.

Next, conventional methods were used successively for: refining, intermediate setting (185° C.), alkali weight reduction (N process), embossing (190° C.), dyeing (130° C.), drying, finishing agent processing, finishing setting (180° C. at a fabric speed of 20 m/min, with a set zone of 24 m).

The resulting stretch weave was visually evaluated.

Example 1

Conventional methods were used to polymerize polyurethane from PTMG with a number-averaged molecular weight of 2900, MDI and ethylene glycol in a 35 wt % solution of DMAc to prepare polymer solution A1.

Next, as the sulfonate group-containing copolymer, phenol sulfonate and 4,4'-dihydroxy diphenyl sulfone at a molar ratio of 52 to 48 corresponding to Chemical Formula (II) (molar concentration 52%) were used to prepare a formaldehyde condensation polymer (b1), which was placed into a DMAc solution.

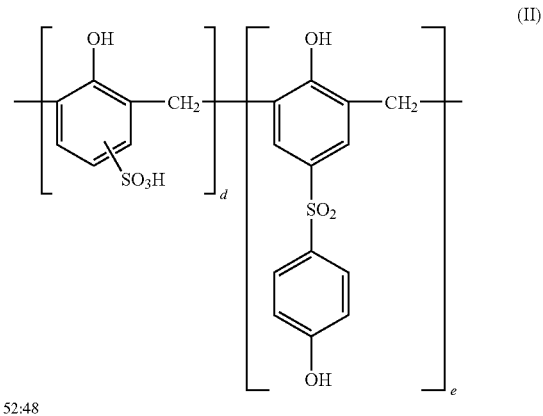

d:e = 52:48

To prepare the DMAc solution, a horizontal mill, the DYNO-MIL KDL made by Willy A. Bachofen Co. was used filled with 85% zirconium beads and operated at a flow rate of 50 g/minute to produce a fine dispersion of 35 wt % of the sulfonate group-containing copolymer in DMAc.

Then, for the antioxidant, a 2:1 mixture of (Dupont Methacrole™ 2462, c1) produced by reacting t-butyl diethanol amine and methylene-bis-(4-cyclohexyl isocyanate) and Dupont Methacrole™ 2390, c2) produced by condensation polymerization of p-cresol and divinyl benzene were prepared in a DMAc solution as an antioxidation agent (concentration 35 wt %), and this was added with other additives to solution C1 (55 wt %)

A uniform mixture was made of a respective 94 wt %, 3 wt % and 3 wt % of the polymer solution A1, the copolymer solution B1 that contained the copolymer of sulfonate group-containing monomer, and the solution C1 of other additives, to prepare the spinning solution D1.

Dry spinning was performed with this spinning solution with a speed ratio of 1.4 between the Godet roller and the reel at a spinning speed of 540 m/min. to produce (200 g of spun yarn) of polyurethane, which was 20 decitex, monofilament elastic yarn that contained 3 wt % of a copolymer of the sulfonate group-containing compounds (molar concentration of the sulfonate groups in the monomer was 52%).

The composition (wt %) of the resulting polyurethane elastic yarn is as shown in Table 1. Further, the number-averaged molecular weight of the copolymer b1 from the sulfonate group-containing compounds was about 80,000. Also, the computed value for the sulfonate group content was 61 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. The strength at breakage was much higher than it was for Comparative Example 1 (described below) wherein the copolymer b1 of compounds containing sulfonate groups was not included. Further, the color was excellent. Also, compared with Comparative Example 1, alkali resistance 1, alkali resistance 2 and chemical resistance values were greatly increased, by 2 times, 3.7 times and 2 times, respectively. The heat softening temperature, which is a measure of heat resistance, was also improved over Comparative Example 1.

Also, as a result of evaluating the dye adherence of the black cationic dye on the polyurethane elastic yarn, dyeing properties were extraordinarily good, and good colorfastness with washing was achieved at color fading class 4-5. When quality of appearance 1 was evaluated, the color tone closely resembled that of the copolymer polyester fibers dyed with a cationic dye, and alkali resistance 1 and alkali resistance 2 were excellent, as was and the quality of appearance.

Example 2

The formaldehyde condensation polymer (b2) of phenol sulfonate as shown in Chemical Formula (III) was used as the sulfonate group-containing copolymer. It was prepared as a fine dispersion in DMAc.

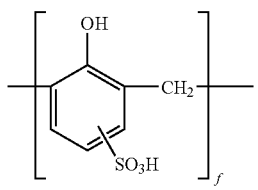

(III)

A method similar to that used in Example 1 was employed in preparing the fine dispersion, with the polymer of the sulfonate group-containing compound being dispersed in DMAc (35 wt %). The spinning solution D2 was prepared by mixing 92 wt %, 5 wt %, and 3 wt %, respectively of the polymer solution A1 from Example 1, the polymer solution B2 from the foregoing compounds containing sulfonate groups, and the solution of other additives C1 as prepared in Example 1.

The polyurethane elastic yarn (200 g spool) was prepared by dry spinning the spinning solution with a speed ratio of 1.40 between the Godet roller and reel at a spinning speed of 540 m/min. into a 20 decitex, monofilament having a content of 5 wt % of the polymer of the compound containing a sulfonate group (molar concentration of the sulfonate group-containing monomer was 100 mol %).

Table 1 shows the composition (wt %) of the resulting polyurethane elastic yarn. The number-averaged molecular weight of the compound b2 was approximately 40,000. Further, the computed sulfonate group content was 194 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. The stretch to breakage was higher than that of Comparative Example 1 (described below), and the degree of elongation was similar. Set was reduced compared with Comparative Example 1, and resilience was improved. Color was good. Compared with Comparative Example 1, the alkali resistance 1, alkali resistance 2 and chemical resistance were much higher, at 2.2 times, 4.3 times and 2.8 times, respectively. The heat softening point, as a gauge of the heat resistance, was 4° C. higher than it was for Comparative Example 1.

Further, as a result of evaluating the dye adherence properties of this polyurethane elastic yarn when dyed with a black cationic dye, excellent dye adherence was realized, and colorfastness after washing was good, at a class 5 fading. The examination of the quality of appearance 1 revealed that the color was similar to that of cationic dye dyeable copolymer polyester fibers, and that their was no fade spots—appearance was excellent.

Also, when quality of appearance 2 was evaluated in the same way as it was in Example 1, no defects were found when stretched, and appearance was excellent.

Example 3

Polyurethane polymer (a2) was polymerized using conventional methods from PTMG with a number-averaged molecular weight of 1800, MDI, ethylene diamine, and diethyl amine as an end-capping agent, in a DMAc solution (35 wt %), to obtain polymer solution (A2). Next a mixture was prepared using this DMAc solution A2, the copolymer solution B1 with the compound containing sulfonate groups that was prepared for Example 1, and the additive solution C1 of other additives that was prepared in Example 1, in the amounts of 92 wt %, 5.0 wt %, 3.0 wt %, respectively, to prepare the spinning solution D3.

Dry spinning was performed with this spinning solution D3 with a speed ratio of 1.20 between the Godet roller and the reel, at a speed of 600 m/min. to prepare (a 500 g/spool) of 20 decitex, dual filament type multifilament yarn, of polyurethane elastic yarn containing 5 wt % of the copolymer having a sulfonate group-containing compound (the molar concentration of the sulfonate group-containing monomer was 50 mol %).

The composition (wt %) of the polyurethane elastic yarn is shown in Table 1. Further, the number-averaged molecular weight of the compound b1 was about 80,000. The computed sulfonate group content was 102 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. The stretch to breakage and strength at breakage both were higher than of Comparative Example 2 (described below), which did not include the copolymer b1 with the compound containing sulfonate groups. Set was reduced over that of Comparative Example 1, and recovery was improved. Color tone was good.

Alkali resistance 1, alkali resistance 2, and chemical resistance were much better than with Comparative Example 1, being 2.7 times, 4.0 times and 3.2 times higher, respectively. The heat softening temperature as a gauge of heat resistance was 10° C. higher than Comparative Example 2.

The dye adherence for dyeing with black cationic dye was evaluated for the polyurethane elastic yarn and was found to be very good; colorfastness with washing was good at class 4-5 for fading. The quality of appearance 1 results showed color similar to that of copolymer polyester fibers dyed with a cationic dye, and there was no spot fading and it exhibited an excellent quality of appearance.

Quality of appearance 2 was evaluated as in Example 1, and no defects were found in the stretched fabric; quality of appearance was excellent.

Example 4

The sulfonate group-containing copolymer was the phenol sulfonate and divinyl benzene addition polymer as shown by Chemical Formula (IV) (made with 50% molar concentration of the sulfonate group-containing monomer, b3), and a DMAc solution of it was prepared.

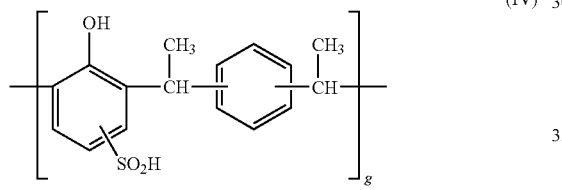

(IV)

The method of Example 1 was used to prepare the DMAc solution, and the copolymer solution containing the compound having sulfonate groups B3 was (35 wt %).

The spinning solution D4 was prepared by mixing the polymer solution A2 prepared in Example 3, the foregoing copolymer solution B3 containing the compound with sulfonate groups, and the solution of other additives C1 prepared in Example 1 in the amounts of 82 wt %, 15 wt %, and 3.0 wt %, respectively.

The polyurethane elastic yarn (500 g spool) was prepared from the spinning solution D4 using a 1.30 speed ratio between the Godet roller and the reel and a spinning speed of 600 m/min. to obtain a 20 decitex, dual filament type multifilament which contained 15% by weight of the copolymer from a compound containing sulfonate groups (the molar concentration of the monomer with the sulfonate groups was 50 mol %).

The composition of the resulting polyurethane elastic yarn (wt. %) is shown in Table 1. The number-averaged molecular weight of the b3 compound was 120,000. The computed sulfonate group content was 291 millimoles/kg.

The stretch to breakage, strength at breakage, setting, stress relaxation, alkali resistance 1, alkali resistance 2, chemical resistance, heat softening point and color tone results for this polyurethane elastic yarn are shown in Table 2. The strength at breakage was higher than it was for Comparative Example 2 (described below) where no copolymer b3 containing the compound having sulfonate group was included. The stretch to breakage was similar. Set was reduced over Comparative Example 2 and recovery was improved. Color tone was good. There was a vast improvement compared with Comparative Example 2 in alkali resistance 1, alkali resistance 2 and chemical resistance, 3.0 times, 4.4 times and 3.1 times greater, respectively. The heat softening point as a gauge of heat resistance was 13° C. higher than for Comparative Example 2.

The black cationic dye adherence of this polyurethane elastic yarn was very good, and colorfastness after washing was good at class 5 fading. Further, when the quality of appearance 1 was evaluated, the color was similar to that of copolymer polyester fibers dyed with a cationic dye with no spot fading and an excellent quality of appearance.

Further, when quality of appearance 2 was evaluated as in Example 1, no defects were found in the stretched fabric and quality of appearance was excellent.

Example 5

The phenol sulfonate and 4,4'-dihydroxy phenyl sulfone at a molar ratio of 20:50 shown in Formula (V) was used to prepare the formaldehyde condensed polymer (b4), which was prepared in a DMAc solution.

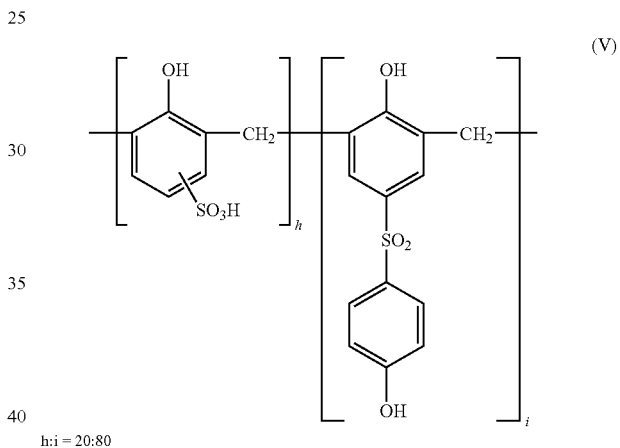

(V)

h:i = 20:80

A fine dispersion of the polymer from a compound containing sulfonate groups was made in DMAc (35 wt %), to prepare solution B4, using a horizontal mill, model DYNO-MIL KDL by Willy A. Bachofen Co. filled with 85% zirconium beads refluxed at 50 g/min.

A uniform mixture was prepared of the polymer solution A1 prepared in Example 1 and the foregoing solution B4 of the polymer containing a compound with sulfonate groups comprising 97 wt % and 3 wt %, respectively, to prepare the spinning solution C5. This spinning solution C5 was dry spun with a 1.4 speed ratio between the Godet roller and the reel, to prepare 20 decitex, monofilament, polyurethane elastic yarn (200 g spool) which contained 3 wt % of the copolymer from the compound with sulfonate groups (the molar concentration of the monomer having the sulfonate groups was 20 mol %).

The composition (wt %) of the resulting polyurethane elastic yarn is as shown in Table 1. The number-averaged molecular weight of the compound b4 was approximately 20,000. Further, the computed content of sulfonate groups was 24 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. The strength at breakage was higher than it was for Comparative Example 1 (described below) which contained no copolymer b4 from a compound having sulfonate groups. Stretch to breakage was similar between the two. Set was reduced over that of Comparative Example 1, and recovery was improved. Color tone also was good. Alkali resistance 1, alkali resistance 2 and chemical resistance were vastly improved over Comparative Example 1 at 1.7 times, 3.0 times and 1.9 times, respectively. The heat softening point as a gauge of heat resistance was 2° C. higher than that of Comparative Example 1.

Excellent dye adherence properties were obtained when the polyurethane elastic yarn dyed with black cationic dye was evaluated. Colorfastness with washing was good at a class 4 fade. Further, the quality of appearance 1 evaluation revealed that the color was similar to that of copolymer polyester fibers dyed with a cationic dye, appearance was excellent with no fading.

Example 6

The polymer shown in Chemical Formula (VI) was used as the sulfonate group-containing compound (b5), which was prepared as a fine dispersion in DMAc.

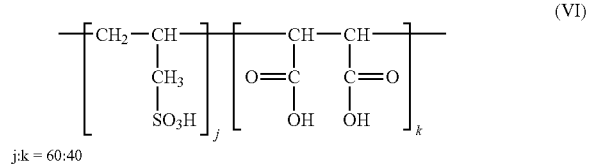

j:k = 60:40

The method of Example 1 was used to prepare the fine dispersion of the polymer containing a compound with sulfonate groups in DMAc to prepare dispersion B5 (35 wt %).

The polymer solution A2 prepared in Example 3 was mixed with the foregoing polymer solution B5 that contained a compound with sulfonate groups at 97.0 wt % and 3.0 wt %, respectively, to prepare the spinning solution D6.[0150] The polyurethane elastic yarn (200 g spool) containing 3.0 wt % of the polymer containing a compound with sulfonate groups (the molar concentration of the monomer with the sulfonate groups was 60 mol %) with a speed ratio of 1.20 between the Godet roller and the reel and a spinning speed of 600 m/min, to produce 20 decitex, dual filament type multifilament yarn.

Table 1 shows the composition (wt %) of the resulting polyurethane elastic yarn. The number-averaged molecular weight of the compound b5 was approximately 15,000 and the computed content of sulfonate groups was 150 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. The stretch to breakage and strength at breakage were both higher than those of Comparative Example 2 (described below) which did not include the polymer b5 that contained a compound with sulfonate groups. Set was reduced over Comparative Example 2 and recovery was improved. Alkali resistance 1, alkali resistance 2 and chemical resistance were vastly improved over Comparative Example 2, 2.4 times, 2.7 times, and 3.0 times, respectively. The heat softening point as a gauge of heat resistance was 2° C. higher than that of Comparative Example 2.

Very good dye adherence was noted in the evaluation of black cationic dye to the polyurethane elastic yarn, and good colorfastness with washing was achieved with color fading in class 4. Further, the color was similar to that of copolymer polyester fibers dyed with a cationic dye when evaluated in the quality of appearance 1, there were further no fade spots, and the appearance was excellent.

Example 7

The DMAc solution (b6) was prepared using the copolymer containing the compound having sulfonate groups according to the below listed Chemical

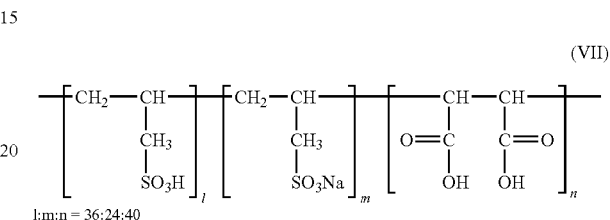

l:m:n = 36:24:40

The method of Example 3 was followed except for the use of the polymer b6 containing a compound with sulfonate groups to produce 20 decitex, dual filament type multifilament polyurethane elastic yarn (200 g spool) that contained 3.0 wt % of the polymer including a compound with sulfonate groups (the molar concentration of the monomer with the sulfonate groups was 36 mol %).

The composition (wt. %) of the resulting polyurethane elastic yarn is shown in Table 1. The number-averaged molecular weight of the compound b6 was about 20,000. The computed sulfonate group content was 172 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. Both the stretch to breakage and strength at breakage were higher than that of Comparative Example 2 (described below). Set was at about the same level as Comparative Example 2. The color tone was good. Alkali resistance 1, alkali resistance 2 and chemical resistance were vastly improved over that of Comparative Example 2, at 2.7 times, 4.2 times, and 3.2 times, respectively. The heat softening point as a gauge of heat resistance was 3° C. higher than that of Comparative Example 2.

Excellent dye adherence was found in the evaluation of the dyeing of the polyurethane elastic yarn with black cationic dye, and its colorfastness with washing was good at color fading class 4. The results of the quality of appearance 1 evaluation was that the color was similar to that of copolymer polyester fibers dyed with a cationic dye, and quality of appearance was excellent.

Comparative Example 1

A uniform mixture was made of the polymer solution A1 and the solution of other additives C1, 97 wt % and 3 wt %, respectively, that were prepared in Example 1 to prepare the spinning solution E1. The spinning solution was dry spun with a speed ratio between the Godet roller and reel of 1.40 at a speed of 540 m/min. to produce 20 decitex, monofilament polyurethane elastic yarn.

The composition (wt %) of the resulting polyurethane elastic yarn is shown in Table 1. The computed sulfonate group content was 0 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. Alkali resistance 1, alkali resistance 2 and chemical resistance were all vastly inferior to those of Examples 1, 2 and 5, which contained a polymer from a compound having sulfonate groups.

Further, the quality of appearance evaluation 1 revealed that the dye did not adhere to the polyurethane elastic yarn, in other words, the color tone was different than that of cationic dye dyeable copolymer polyester, and there was an impermissible level of fade spots and problems with the quality of appearance.

The same method as in Example 1 was used for the quality of appearance 2 evaluation, where defects from processing, permanent fatigue in the polyurethane fibers, and a wavy appearance made it unsatisfactory.

Comparative Example 2

A uniform mixture was made of the polymer solution A2 prepared for Example 3 and the solution of other additives C1 prepared in Example 1, 95 wt % and 3 wt %, respectively, to prepare the spinning solution E2. The spinning solution E2 was dry spun with a speed ratio between the Godet roller and reel of 1.20 at a speed of 600 m/min. to produce 20 decitex, dual filament type polyurethane elastic yarn (500 g spool).

The composition (wt %) of the resulting polyurethane elastic yarn is shown in Table 1. The computed sulfonate group content was 0 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. The alkali resistance 1, alkali resistance 2 and chemical resistance were all vastly inferior to those in Examples 3, 4, 6, and 7, which contained a polymer with sulfonate groups.

Further, the quality of appearance 1 evaluation revealed that the dye did not adhere to the polyurethane elastic yarn, in other words, the color tone was different then that of copolymer polyester fibers dyed with a cationic dye, and there was an impermissible level of fade spots and problems with the quality of appearance.

The same method as in Example 1 was used for the quality of appearance 2 evaluation, where defects from processing, permanent fatigue in the polyurethane fibers, and a wavy appearance made it unsatisfactory.

Comparative Example 3

A DMAc solution F1 was prepared with polyvinylidine fluoride (35 wt %) (number-averaged molecular weight 48,000, f1) made by Kureha Chemical Industries, Co. Ltd. The method of the solution preparation was the same as used in Example 1.

Then, spinning solution E3 was prepared with the polymer solution A2 prepared in Example 3, the foregoing polyvinylidine fluoride solution F1, and the solution of other additives C1 that was prepared in Example 1 of 92 wt %, 5 wt % and 3.0 wt % respectively.

The spinning solution E3 was dry spun with a speed ratio between the Godet roller and reel of 1.30 at a speed of 600 m/min. to produce 20 decitex, dual filament type multifilament polyurethane elastic yarn (500 g spool).

The composition (wt %) of the resulting polyurethane elastic yarn is shown in Table 1. The computed content of sulfonate groups was 0 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. Although the chemical resistance was 1.5 times higher than that of Comparative Example 2, which had no addition of polyvinylidine fluoride, it remained inferior to that of Examples 3, 4, 6, 7, etc. Further the alkali resistance 1 and alkali resistance 2 were inferior to those of Examples 3, 4, 6 and 7.

Further, the quality of appearance 1 evaluation revealed that the dye did not adhere to the polyurethane elastic yarn, in other words, the color tone was different then that of cationic dye dyeable copolymer polyester, and there were problems with the quality of appearance Further, when the quality of appearance 2 was evaluated in the same way as in Example 1, there was increased set in the polyurethane yarn, which was believed to be the cause of an overall wavy, unsatisfactory appearance.

Comparative Example 4

A (35 wt %) solution F2 was prepared in DMAc of sulfonic acid-modified polyvinyl alcohol, "Gohseran" (R) made by Nippon Synthetic Chemical Co., Ltd (f2 which had a molar concentration of 1.5% of the monomer having sulfonate groups). The same method described in Example 1 was used to prepare the DMAc solution.

The polymer solution A2 from Example 3, the foregoing sulfonic acid-modified polyvinyl alcohol solution F2, and the solution of other additives C1 prepared in Example 1 were uniformly mixed, 82 wt %, 5 wt %, and 3.0 wt %, respectively, to prepare the spinning solution E4.

The spinning solution was dry spun with a speed ratio between the Godet roller and reel of 1.30 at a speed of 600 m/min. to produce 20 decitex, dual filament type multifilament polyurethane elastic yarn (500 g spool).

The composition (wt. %) of the resulting polyurethane elastic yarn is shown in Table 1. The computed content of sulfonate groups was between 1 millimole/Kg and 2 millimoles/Kg.

The stretch to breakage, strength at breakage, setting, stress relaxation, alkali resistance 1, alkali resistance 2, chemical resistance, heat softening point and color tone results for this polyurethane elastic yarn are shown in Table 2. A 9° C. drop in the chemical softening point was noted with respect to Comparative Example 2, the alkali resistance 1, alkali resistance 2 and chemical resistance were from 1.1 times to 1.7 times higher than Comparative Example 2, which did not contain the sulfonic acid modified polyvinyl alcohol, but these results were still vastly inferior to those of Examples 3, 4, 6, 7, etc.

The dye adherence was poor in the evaluation of the polyurethane elastic yarn dyed with black cationic dye. Further, the quality of appearance evaluation revealed that the dye did not adhere to the polyurethane elastic yarn, in other words, the color tone was different then that of cationic dye dyeable copolymer polyester, and there was an impermissible level of fade spots and problems with the quality of appearance.

The same method as in Example 1 was used for the quality of appearance 2 evaluation, where defects from processing, permanent fatigue in the polyurethane fibers, and a partial wavy appearance made it unsatisfactory.

Comparative Example 5

A dispersion F3 (35 wt %) in DMAc was prepared using the same method as Example 1 with the dehydrated solids from Hi-Fix GM, a type of synthetic solids (made by the former Dainippon Pharmaceuticals, Co., Ltd, currently, the O.G. Co., Ltd.), which is a dark brown 30% aqueous solution of a dihydroxy diphenyl sulfone compound). The solution, F3 exhibited a dark brown, turbid, coffee-like color.

The spinning solution E5 was prepared as a uniform solution with the polymer solution A2 prepared in Example 1, the foregoing dispersion F2 of dihydroxy diphenyl sulfone type compound, and the solution C1 of other additives prepared in Example 1 in the amounts of, 96 wt %, 1.0 wt %, 3.0 wt %.

The spinning solution E5 was dry spun with a speed ratio between the Godet roller and reel of 1.30 at a speed of 640 m/min. to produce 20 decitex, dual filament type multifilament polyurethane elastic yarn (500 g spool).

The stretch to breakage, strength at breakage, setting, stress relaxation, alkali resistance 1, alkali resistance 2, chemical resistance, heat softening point and color tone results for this polyurethane elastic yarn are shown in Table 2. The heat softening point was the same as that of Comparative Example 2, as were the alkali resistance 1, alkali resistance 2 and chemical resistance, which ranged up to 1.2 times higher than that of Comparative Example 2, but still, these were vastly inferior to the results obtained from Examples 3, 4, 6, 7, etc.

The dye adherence was poor when the dyeing of the polyurethane elastic yarn with black cationic dye was evaluated. Further, the quality of appearance 1 evaluation revealed that the dye did not adhere to the polyurethane elastic yarn, in other words, the color tone was different then that of cationic dye dyeable copolymer polyester, and there was an impermissible level of fade spots and problems with the quality of appearance.

The color tone of the resulting polyurethane elastic yarn was brown with a strong reddish cast. Although stretch fabric was prepared for the quality of appearance 2 evaluation, the resulting raw knit fabric was very unsatisfactory. The quality of appearance 2 evaluation was implemented, but there were several types of processing marks, and fatigue in the polyurethane yarn that caused partial waviness, and caused it to be evaluated as unsatisfactory.

TABLE 1

| Example (EX) No. or Comparative Example (CE) No. | Base Polymer | | Polymer of compound which has a sulfonate group, and/or copolymer thereof | | | | | |
|---|---|---|---|---|---|---|---|---|
| | (a1) Polyurethane polymer comprising PTMG, MDI, EG | (a2) Polyurethane polymer comprising PTMG, MDI, EDA | (b1) Formaldehyde condensation polymer of phenol sulfonate and 4,4'-dihydroxy diphenyl sulfone (molar concentration containing sulfonate monomer 52%) | (b2) Formaldehyde condensation polymer of phenol sulfonate | (b3) Addition polymer of phenol sulfonate and divinyl benzene | (b4) Formaldehyde condensation polymer of phenol sulfonate and 4,4'-dihydroxy diphenyl sulfone (molar concentration containing sulfonate monomer 20%) | (b5) Addition polymer of propylene sulfonate and maleic acid | (b6) Addition polymer of propylene sulfonate and propylene sulfonic acid salt and maleic acid |
| EX 1 | 94 | 0 | 3 | 0 | 0 | 0 | 0 | 0 |
| EX 2 | 92 | 0 | 0 | 5 | 0 | 0 | 0 | 0 |
| EX 3 | 0 | 92 | 5 | 0 | 0 | 0 | 0 | 0 |
| EX 4 | 0 | 82 | 0 | 0 | 15 | 0 | 0 | 0 |
| EX 5 | 97 | 0 | 0 | 0 | 0 | 3 | 0 | 0 |
| EX 6 | 0 | 97 | 0 | 0 | 0 | 0 | 3 | 0 |
| EX 7 | 0 | 97 | 0 | 0 | 0 | 0 | 0 | 3 |
| CE 1 | 97 | 0 | 0 | 0 | 0 | 0 | 0 | 0 |
| CE 2 | 0 | 97 | 0 | 0 | 0 | 0 | 0 | 0 |
| CE 3 | 0 | 92 | 0 | 0 | 0 | 0 | 0 | 0 |
| CE 4 | 0 | 82 | 0 | 0 | 0 | 0 | 0 | 0 |
| CE 5 | 0 | 96 | 0 | 0 | 0 | 0 | 0 | 0 |

| Example (EX) No. or Comparative Example (CE) No. | Other additives | | | | | Total of components (wt %) | Total sulfonate groups (mmol/Kg computed value) |
|---|---|---|---|---|---|---|---|
| | (f1) Polyvinylidine fluoride | (f2) Sulfonic acid-modified polyvinyl alcohol | (f3) Synthetic tannic acid (Hi-Fix GM, a dye adherence promoter for nylon by OG Co.) | (c1) Polyurethane synthesized by reaction of t-butyl diethanol amine and methylene bis-(4-cyclohexyl isocyanate) | (c2) Condensation polymer of p-cresol and divinyl benzene | | |
| EX 1 | 0 | 0 | 0 | 2 | 1 | 100 | 61 |
| EX 2 | 0 | 0 | 0 | 2 | 1 | 100 | 194 |
| EX 3 | 0 | 0 | 0 | 2 | 1 | 100 | 102 |
| EX 4 | 0 | 0 | 0 | 2 | 1 | 100 | 291 |
| EX 5 | 0 | 0 | 0 | 0 | 0 | 100 | 24 |

TABLE 1-continued

| | | | | | | | |
|---|---|---|---|---|---|---|---|
| EX 6 | 0 | 0 | 0 | 0 | 0 | 100 | 150 |
| EX 7 | 0 | 0 | 0 | 0 | 0 | 100 | 172 |
| CE 1 | 0 | 0 | 0 | 2 | 1 | 100 | 0 |
| CE 2 | 0 | 0 | 0 | 2 | 1 | 100 | 0 |
| CE 3 | 5 | 0 | 0 | 2 | 1 | 100 | 0 |
| CE 4 | 0 | 15 | 0 | 2 | 1 | 100 | 1 to 2 |
| CE 5 | 0 | 0 | 1 | 2 | 1 | 100 | — |

TABLE 2

| | Properties of Polyurethane Elastic Yarn | | | | | | | | Dyeing properties | Dyeing Evaluation Results | |
|---|---|---|---|---|---|---|---|---|---|---|---|
| | Elongation (%) | Strength (cN) | Set (%) | Stress Relaxation (%) | Heat Softening Point (° C.) | Alkali Resistance 1 (%) | Alkali Resistance 2 (%) | Chemical Resistance (%) | Color Tone | with black cationic dye (L* value) | Colorfastness with washing (Color fading class) | Raw fabric apperance quality (round knit Bayer fabric fade spot evaluation) |
| EX 1 | 400 | 26 | 20 | 33 | 182 | 70 | 55 | 70 | A | A 10.7 | 4-5 | A |
| EX 2 | 395 | 30 | 22 | 34 | 184 | 77 | 64 | 98 | B | A 9.2 | 5 | A |
| EX 3 | 495 | 33 | 12 | 26 | 215 | 82 | 80 | 92 | A | A 11.5 | 4-5 | A |
| EX 4 | 490 | 40 | 17 | 25 | 218 | 90 | 87 | 89 | A | A 9.3 | 5 | A |
| EX 5 | 400 | 24 | 22 | 33 | 182 | 60 | 45 | 68 | A | A 12.4 | 4 | A |
| EX 6 | 495 | 29 | 16 | 28 | 207 | 72 | 54 | 88 | A | A 14.1 | 4 | A |
| EX 7 | 500 | 26 | 18 | 28 | 208 | 80 | 84 | 92 | A | A 15.6 | 4 | A |
| CE 1 | 400 | 21 | 25 | 35 | 180 | 35 | 15 | 35 | A | not dyed | — | D |
| CE 2 | 490 | 25 | 18 | 28 | 205 | 30 | 20 | 29 | A | not dyed | — | D |
| CE 3 | 495 | 24 | 19 | 27 | 200 | 39 | 22 | 45 | A | not dyed | — | D |
| CE 4 | 505 | 22 | 26 | 30 | 196 | 52 | 25 | 33 | B | C 82.5 | 4-5 | D |
| CE 5 | 485 | 24 | 26 | 28 | 206 | 36 | 22 | 40 | D | C 75.1 | 4-5 | D |

INDUSTRIAL UTILITY

The polyurethane elastic yarn according to the present invention delivers high strength stretch, high recovery properties, resistance to various chemical agents, high heat resistance and is capable of being dyed with colorfast cationic dyes. As a result, this yarn is excellent for use in clothing, etc. where it provides excellent ease of putting on and taking off, wear feeling, dyeing properties, resistance to discoloration, and an excellent quality of appearance.

Due to these excellent properties, rather than solely using the polyurethane yarn of the present invention, it can be used in blends with a variety of other fibers to produce excellent stretch fabrics that are well suited as knits, woven or braided fabrics. Examples of specific applications for which it can be used include socks, stockings, round knits, tricots, swim suits, ski pants, work clothes, firefighter clothing, golf pants, wet suits, bras, girdles, gloves and a variety of other fiber products, in shrink materials, and further, and as leak-proof bands in paper and other sanitary products, as shrinkable waterproof material, as artificial bait, flower arrangements, wrapping cloth, copy cleaner, gaskets, etc.

We claim:

1. Polyurethane elastic yarn comprising primary structural components of polymer diol and diisocyanate, and further comprising as an additive component thereto prior to spinning a polymer which contains a sulfonate group, wherein the polymer which contains a sulfonate group comprises a monomer which has a sulfonate group that is present at a molar concentration of the monomer of at least 5 mol %, wherein said polymer which contains a sulfonate group is a formaldehyde condensation polymer.

2. The polyurethane elastic yarn according to claim 1 wherein the content of said polymer which contains a sulfonate group is from 0.5 wt % to 50 wt %.

3. The polyurethane elastic yarn according to claim 1 or 2 wherein the number-averaged molecular weight of said polymer which contains a sulfonate group is from 2000 to 500000.

4. The polyurethane elastic yarn according to claim 1 wherein said polymer which contains a sulfonate group is a copolymer of a monomer which has a sulfonate group and a monomer which has a sulfonyl group (excluding sulfonic acid).

5. The polyurethane elastic yarn according to claim 4 wherein said monomer which has a sulfonyl group (excluding sulfonic acid) is an aromatic sulfone.

6. The polyurethane elastic yarn according to claim 5 wherein said monomer which has a sulfonyl group (excluding sulfonic acid) is a dihydroxy diphenyl sulfone.

7. The polyurethane elastic yarn according to claim 4 wherein the copolymer of said monomer which has a sulfonate group and said monomer which has a sulfonyl group (excluding sulfonic acid) is a formaldehyde condensation polymer of benzene sulfonate or phenol sulfonate and 4,4'-dihydroxy diphenyl sulfone.

8. The polyurethane elastic yarn according to claim 1 wherein the b-value as determined by a Hunter type colorimeter is less than 15.

9. The polyurethane elastic yarn according to claim 1 which exhibits dyeing properties of $L^* \leq 20$ when dyed with a black cationic dye.

10. The polyurethane elastic yarn according to claim 1 wherein the content of said sulfonate groups is greater than or equal to 10 millimoles/kilogram and less than or equal to 500 millimoles/kilogram.

11. Stretchable fabric wherein the polyurethane elastic yarn according to claim 1 and other fibers are blended.

12. A method of production of polyurethane elastic yarn containing a polymer which contains a sulfonate group, comprising the step of producing an elastic yarn comprising polyurethane having primary structural components of polymer diol and diisocyanate, wherein said polymer which contains a sulfonate group is a formaldehyde condensation polymer and wherein said polymer which contains a sulfonate group is added to a solution of polyurethane having primary structural components of polymer diol and diisocyanate, and spinning is performed.

13. The method of production of polyurethane elastic yarn according to claim 12 wherein said polymer which contains a sulfonate group uses a monomer which has a sulfonic acid salt.

\* \* \* \* \*